(12) United States Patent
Inoko (10) Patent No.: US 8,066,380 B2
(45) Date of Patent: Nov. 29, 2011

(54) PROJECTOR-TYPE IMAGE DISPLAY APPARATUS

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 12/111,694

(22) Filed: Apr. 29, 2008

(65) Prior Publication Data

US 2008/0204609 A1 Aug. 28, 2008

Related U.S. Application Data

(63) Continuation of application No. 11/219,239, filed on Sep. 1, 2005, now Pat. No. 7,429,110.

(30) Foreign Application Priority Data

Sep. 16, 2004 (JP) .................................. 2004-269956

(51) Int. Cl.
*G03B 21/14* (2006.01)
*G03B 21/26* (2006.01)
*G03B 21/28* (2006.01)
*G02B 27/14* (2006.01)
*G02B 27/12* (2006.01)
*G02F 1/1335* (2006.01)
*H04N 5/74* (2006.01)

(52) U.S. Cl. ................ 353/20; 353/33; 353/34; 353/81; 353/82; 348/750; 348/758; 349/9; 359/634; 359/638; 359/640

(58) Field of Classification Search .................... 353/20, 353/30, 31, 33, 34, 37, 81, 82, 98, 99, 102; 348/739, 742, 744, 750, 757, 758, 771; 349/5, 7–9; 359/618, 629, 634, 636, 638–640
See application file for complete search history.

(56) References Cited

U.S. PATENT DOCUMENTS

| 5,268,775 A | 12/1993 | Zeidler |
| 5,658,490 A | 8/1997 | Sharp |
| 5,751,384 A | 5/1998 | Sharp |
| 5,786,873 A | 7/1998 | Chiu |
| 5,822,021 A | 10/1998 | Johnson |
| 5,825,849 A | 10/1998 | Garland |
| 5,929,946 A | 7/1999 | Sharp |
| 5,953,083 A | 9/1999 | Sharp |
| 5,990,996 A | 11/1999 | Sharp |
| 5,999,240 A | 12/1999 | Sharp |
| 6,046,786 A | 4/2000 | Sharp |
| 6,049,367 A | 4/2000 | Sharp |
| 6,078,374 A | 6/2000 | Sharp |
| 6,176,586 B1 | 1/2001 | Hirose et al. |
| 6,183,091 B1 | 2/2001 | Sharp |
| 6,252,638 B1 | 6/2001 | Sharp |

(Continued)

FOREIGN PATENT DOCUMENTS

CN 1479129 A 3/2004

(Continued)

*Primary Examiner* — Rochelle-Ann J Blackman
(74) *Attorney, Agent, or Firm* — Canon U.S.A., Inc. IP Division (57) ABSTRACT

At least one exemplary embodiment is directed to a projector which includes several optical elements, reflective devices and beam splitters, arranged to reduce back reflection effects. At least one exemplary embodiment includes a mirror, two beam splitters, three reflection devices, and two optical elements affecting polarization of incident light upon the optical elements.

15 Claims, 6 Drawing Sheets

U.S. PATENT DOCUMENTS

| | | |
|---|---|---|
| 6,273,571 B1 | 8/2001 | Sharp |
| 6,310,673 B1 | 10/2001 | Sharp |
| 6,380,997 B1 | 4/2002 | Sharp |
| 6,417,892 B1 | 7/2002 | Sharp |
| 6,452,646 B1 | 9/2002 | Sharp |
| 7,131,729 B2 * | 11/2006 | Suzuki et al. .................. 353/20 |
| 7,429,110 B2 * | 9/2008 | Inoko ............................. 353/20 |
| 2002/0140905 A1 | 10/2002 | Ouchi |
| 2003/0147051 A1 * | 8/2003 | Fujita et al. .................... 353/31 |
| 2004/0066492 A1 | 4/2004 | Nakashima et al. |

FOREIGN PATENT DOCUMENTS

| | | |
|---|---|---|
| EP | 1043620 A2 | 11/2000 |
| JP | 5-93887 A | 4/1993 |
| JP | 8-271855 A | 10/1996 |
| JP | 11-271683 A | 10/1999 |
| JP | 2001-154268 A | 6/2001 |
| JP | 2002-357708 A | 12/2002 |
| JP | 2004-126496 A | 4/2004 |

* cited by examiner

PROJECTOR-TYPE IMAGE DISPLAY APPARATUS

CROSS-REFERENCE TO RELATED APPLICATIONS

This application is a Continuation of U.S. patent application Ser. No. 11/219,239 filed Sep. 1, 2005, which claims the benefit of Japanese Application No. 2004-269956 filed Sep. 16, 2004, both of which are hereby incorporated by reference herein in their entirety.

BACKGROUND OF THE INVENTION

1. Field of the Invention

The present invention relates to a projector and more particularly, though not exclusively, to a projector that modulates a light beam via a reflective liquid-crystal panel.

2. Description of the Related Art

Reflective liquid-crystal panels have a higher aperture ratio and higher definition than transmissive liquid-crystal panels, and therefore, projectors equipped with reflective liquid-crystal panels are in great demand. However, in contrast to transmissive-type projectors, reflective-type projectors have the two following optical problems, which have been setting back the popularization of reflective-type projectors.

One of the problems is that a reflection of image light produced in an optical projecting system re-enters the reflective liquid-crystal panel where the light is reflected again so as to re-enter the optical projecting system. As a result, the light passes through the optical projecting system to reach the screen, causing the image contrast to decrease. The other problem is that the light needs to be selected depending on whether the reflective liquid-crystal panel is in an ON mode (a mode in which light is projected) or an OFF mode (a mode in which light is not projected), a polarizing beam splitter must be disposed in front of the panel. For this reason, the color separating/combining system tends to become large in size.

As an attempt to solve the first problem, U.S. Pat. No. 5,268,775 and U.S. Pat. No. 5,786,873 disclose examples in which the direction of polarization of feedback light is rotated by about 90° (e.g., by using a quarter-waveplate) so that the feedback light is substantially removed by a polarizing beam splitter and a polarizer.

On the other hand, for the purpose of solving the second problem, US AA2002/0140905 discusses a system in which two polarizing beam splitters are provided with respect to three reflective liquid-crystal panels corresponding to three primary colors, such that color separation and color combination are performed in the two polarizing beam splitters. According to US AA2002/0140905, wavelength-selective polarization rotators are provided proximate an incident side and an exit side of each polarizing beam splitter. This facilitates the control of the ON-OFF mode of two of the reflective liquid-crystal panels by one of the polarizing beam splitters, so as to select whether to project or not to project light.

However, simply combining these two examples does not solve the two aforementioned problems.

SUMMARY OF THE INVENTION

At least one exemplary embodiment is directed to a projector-type image display apparatus. The projector-type image display apparatus includes a first reflective liquid-crystal display panel corresponding to light within a first wavelength range; a second reflective liquid-crystal display panel corresponding to light within a second wavelength range different from the first wavelength range; an optical projecting system configured to project the light received from the first reflective liquid-crystal display panel and the light received from the second reflective liquid-crystal display panel; a first polarizing beam splitter, where the first polarizing beam splitter guides light of a first polarization direction included in the light of the first wavelength range received from a light source towards the first reflective liquid-crystal display panel, where the first polarizing beam splitter guides light of a second polarization direction included in the light reflected by the first reflective liquid-crystal display panel towards the optical projecting system, the second polarization direction being substantially perpendicular to the first polarization direction, where the first polarizing beam splitter guides light of the second polarization direction included in the light of the second wavelength range received from the light source towards the second reflective liquid-crystal display panel, and where the first polarizing beam splitter guides light of the first polarization direction included in the light reflected by the second reflective liquid-crystal display panel towards the optical projecting system; a first polarizer disposed between the first polarizing beam splitter and the optical projecting system, the first polarizer absorbing one of the light of the first polarization direction and the light of the second polarization direction, and transmitting the other one of the light of the first polarization direction and the light of the second polarization direction; and a first quarter-waveplate disposed between the first polarizer and the optical projecting system.

At least one exemplary embodiment is directed to a projector-type image display apparatus, which includes a first reflective liquid-crystal display panel corresponding to light within a first wavelength range; a second reflective liquid-crystal display panel corresponding to light within a second wavelength range different from the first wavelength range; an optical projecting system configured to project the light received from the first reflective liquid-crystal display panel and the light received from the second reflective liquid-crystal display panel; a first polarizing beam splitter, where the first polarizing beam splitter guides light of a first polarization direction included in the light of the first wavelength range received from a light source towards the first reflective liquid-crystal display panel, where the first polarizing beam splitter guides light of a second polarization direction included in the light reflected by the first reflective liquid-crystal display panel towards the optical projecting system, the second polarization direction being substantially perpendicular to the first polarization direction, where the first polarizing beam splitter guides light of the second polarization direction included in the light of the second wavelength range received from the light source towards the second reflective liquid-crystal display panel, and where the first polarizing beam splitter guides light of the first polarization direction included in the light reflected by the second reflective liquid-crystal display panel towards the optical projecting system; a first polarizer disposed between the first polarizing beam splitter and the optical projecting system, the first polarizer transmitting one of the light of the first polarization direction and the light of the second polarization direction, and guiding the other one of the light of the first polarization direction and the light of the second polarization direction towards the outside of an optical path extending between the first polarizing beam splitter and the optical projecting system; and a first quarter-waveplate disposed between the first polarizer and the optical projecting system.

At least one exemplary embodiment is directed to a projector-type image display apparatus, which includes a plurality of reflective liquid-crystal display panels corresponding to light beams in different wavelength ranges; an optical-path combining system configured to combine optical paths of the light beams received from the plurality of reflective liquid-crystal display panels; an optical projecting system configured to project the light beams received from the optical-path combining system; and a retardation plate disposed between the optical-path combining system and the optical projecting system. The optical-path combining system includes a plurality of polarizers.

Further features of the present invention will become apparent from the following description of exemplary embodiments (with reference to the attached drawings).

DESCRIPTION OF THE EMBODIMENTS

The following description of exemplary embodiment(s) is merely illustrative in nature and is in no way intended to limit the invention, its application, or uses Processes, techniques, apparatus, and materials as known by one of ordinary skill in the relevant art may not be discussed in detail but are intended to be part of the enabling description where appropriate.

Additionally, the actual size of optical elements may not be discussed however any size from macro lenses to nano lenses are intended to lie within the scope of exemplary embodiments (e.g., lenses with diameters of nanometer size, micro size, centimeter size, and meter sizes).

Notice that similar reference numerals and letters refer to similar items in the following figures, and thus once an item is defined in one figure, it may not be discussed for following figures.

Exemplary embodiments of an image display apparatus will now be described with reference to the drawings.

First Exemplary Embodiment

Figure 1:
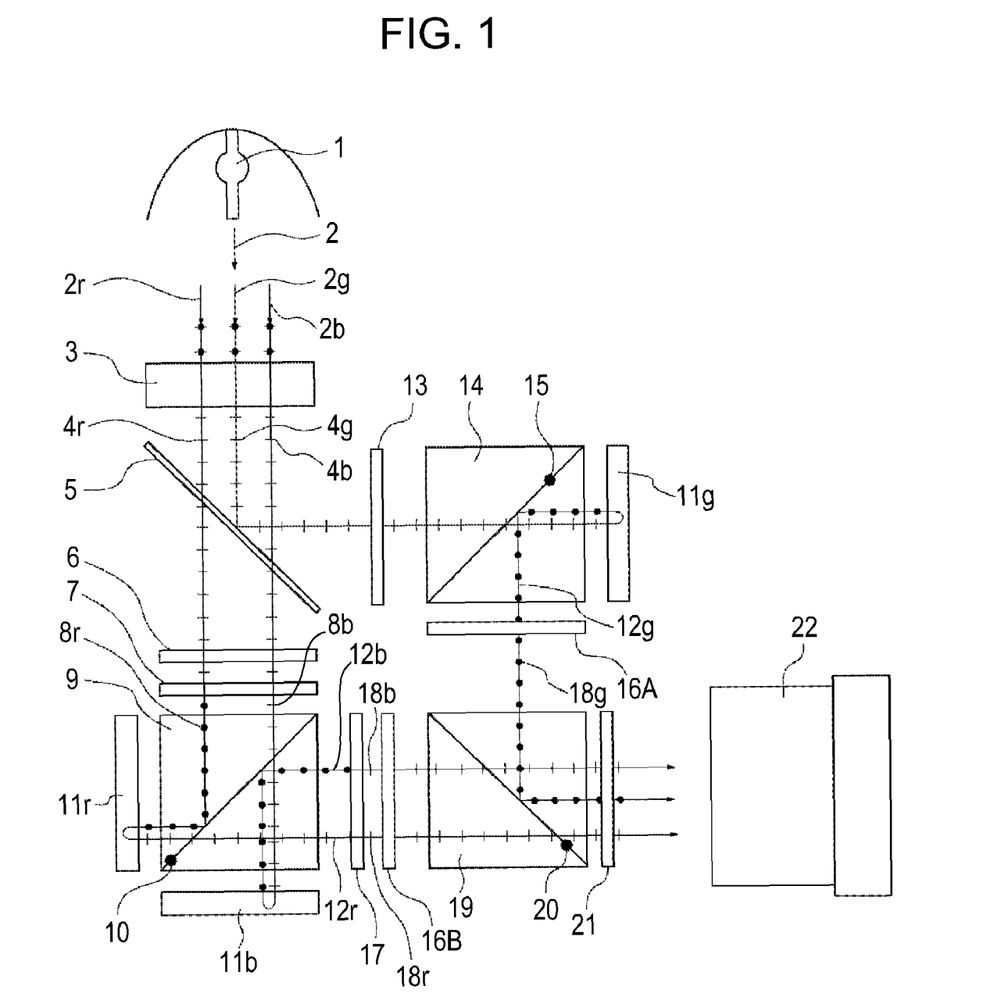
FIG. 1 is a schematic diagram illustrating a first exemplary embodiment.

FIG. 1 illustrates a color separating/combining system of an image display apparatus according to a first exemplary embodiment. The first exemplary embodiment will be described below in detail with reference to FIG. 1. A white light beam released from a light source 1, which emits unpolarized light, is reflected by a reflector and becomes a substantially collimated light beam 2. The white light beam can be split into three primary colors, (e.g., red, green, and blue colors). These three primary colors will respectively be defined as a red light component 2r corresponding to a wavelength range of red color; a green light component 2g corresponding to a wavelength range of green color; and a blue light component 2b corresponding to a wavelength range of blue color.

A polarization converter 3 is disposed in an intermediate section of an optical illumination system and is defined by a polarization-converting array arranged substantially perpendicular to the optical axis. The polarization converter 3 aligns the direction of polarization of these light components so as to facilitate p-polarization of these light components. Thus, these light components are in a polarized state in which the electric field vibrates in a direction substantially parallel to the drawing plane of FIG. 1. As a result, the red light component 2r becomes a p-polarized red light component 4r, the green light component 2g becomes a p-polarized green light component 4g, and the blue light component 2b becomes a p-polarized blue light component 4b. In this case, although all the color light components in the visible range included in the unpolarized light are p-polarized by the polarization converter 3, these color light components can alternatively be s-polarized. As a further alternative, the direction of polarization of one of the color light components can be made substantially perpendicular to that of the two remaining color light components. Furthermore, the polarization converter 3 can be omitted if the light source 1 is a type that emits a light beam substantially in the direction of polarization (e.g., a laser light source). In a case where a laser light source is used, a polarizer can simply be provided. Moreover, in this case, the laser light source can be provided with a plurality of laser light-source components corresponding to the three colors. The laser light-source components can be arranged in a manner such that the direction of polarization of a color light beam emitted from one of the laser light-source components is substantially perpendicular to the direction of polarization of the remaining color light beams emitted from the other light-source components corresponding to the remaining colors.

A dichroic mirror 5 is provided such that it selectively reflects green light components. This means that the dichroic mirror 5 reflects the p-polarized green light component 4g while transmitting the p-polarized red light component 4r and the p-polarized blue light component 4b. On the other hand, in a case where the dichroic mirror 5 is a green-transmissive type, the properties of the dichroic mirror 5 are basically opposite to the description above, and therefore, a description of such a case will be omitted here. The p-polarized red light component 4r and the p-polarized blue light component 4b transmitted through the dichroic mirror 5 pass through a polarizer 6 where the degree of polarization of these light components 4r and 4b is increased. Subsequently, the light components 4r and 4b enter a wavelength-selective polarization rotator 7.

The wavelength-selective polarization rotator 7 has the capability to rotate the direction of polarization of red light components by about 90° but not to rotate the direction of polarization of blue light components. The p-polarized red light component 4r and the p-polarized blue light component 4b passing through the wavelength-selective polarization rotator 7 respectively become an s-polarized red light component 8r and a p-polarized blue light component 8b. The s-polarized red light component 8r and the p-polarized blue light component 8b then enter a polarizing beam splitter 9.

The s-polarized red light component 8r incident on the polarizing beam splitter 9 is reflected by a polarization beam splitting surface 10 and thus enters a reflective liquid-crystal panel 11r. The reflective liquid-crystal panel 11r and reflective liquid-crystal panels 11g and 11b facilitate the rotation by about 90° of the direction of polarization in an ON mode, but does not facilitate the rotation in an OFF mode. Here, the term "ON mode" refers to a display-ON mode in which light is guided towards a projection lens and is projected onto a projection surface (e.g., a screen), whereas the term "OFF mode" refers to a display-OFF mode in which light is blocked from entering the projection lens. Accordingly, in the ON mode, the s-polarized red light component 8r becomes a p-polarized red light component 12r which re-enters the polarizing beam splitter 9. Due to being p-polarized this time, the p-polarized red light component 12r passes through the polarization beam splitting surface 10 and thus exits the polarizing beam splitter 9. On the other hand, although the s-polarized red light component 8r is reflected by the polarization beam splitting surface 10 in the OFF mode, the optical path of the light component 8r reflected from the reflective liquid-crystal panel 11r in the OFF mode will be omitted in FIG. 1. Moreover, although a retardation plate (e.g., a quarter-waveplate) can be provided between the polarizing beam splitter 9 and the reflective liquid-crystal panel 11r to correct the direction of polarization of angled incident light components, such a retardation plate is also not shown in FIG. 1.

On the other hand, due to being p-polarized, the p-polarized blue light component 8b passes through the polarization beam splitting surface 10 and thus enters the reflective liquid-crystal panel 11b. When the reflective liquid-crystal panel 11b is in an ON mode, the p-polarized blue light component 8b becomes an s-polarized blue light component 12b which re-enters the polarizing beam splitter 9. Due to being s-polarized this time, the s-polarized blue light component 12b is reflected by the polarization beam splitting surface 10 and thus exits the polarizing beam splitter 9.

On the other hand, the p-polarized green light component 4g reflected by the dichroic mirror 5 passes through a polarizer 13 where the degree of polarization of the p-polarized green light component 4g is increased. The p-polarized green light component 4g then enters a polarizing beam splitter 14 so as to reach a polarization beam splitting surface 15. The p-polarized green light component 4g passes through the polarization beam splitting surface 15 and enters the reflective liquid-crystal panel 11g. When the reflective liquid-crystal panel 11g is in an ON mode, the p-polarized green light component 4g becomes an s-polarized green light component 12g which re-enters the polarizing beam splitter 14. Due to being s-polarized this time, the s-polarized green light component 12g is reflected by the polarization beam splitting surface 15 and thus exits the polarizing beam splitter 14.

In addition to the color light components 12r, 12g, 12b that are polarized ideally by about 90° by the respective reflective liquid-crystal panels 11r, 11g, 11b in an ON mode, the light released from the corresponding polarizing beam splitters 9, 14 and directed towards a color combiner (optical-path combiner) 19 actually contains light portions that lower the image contrast. Specifically, of the light guided towards the light source 1 by the polarizing beam splitters 9, 14 via pixels of the reflective liquid-crystal panels 11r, 11g, 11b in an OFF mode, light portions leaking towards the projection lens 22 via the polarizing beam splitters 9, 14 can be included in the light released from the polarizing beam splitters 9, 14. Removal of these light portions reduces the effect they have on lowering the image contrast.

Consequently, a polarizer 16A, which polarizes at least green and red light components or green and blue light components, is disposed proximate the exit side of the polarizing beam splitter 14. Thus, the s-polarized green light component 12g exiting the polarizing beam splitter 14 becomes an s-polarized green light component 18g having been substantially removed from its undesirable polarized light portion. The s-polarized green light component 18g then enters the color combiner 19. In this case, the polarizer 16A can absorb the undesirable polarized light portion, or can reflect the undesirable polarized light portion towards the outside of the optical path (i.e., vertically up/down the page). According to at least one exemplary embodiment, since the absorbed light portion will not proceed along the optical path, the absorption of the undesirable polarized light portion is included in the meaning of the phrase "guide the undesirable polarized light portion towards the outside of the optical path".

On the other hand, a wavelength-selective polarization rotator 17 is disposed proximate the exit side of the polarizing beam splitter 9, such that the wavelength-selective polarization rotator 17 has the capability to rotate the direction of polarization of blue light components by about 90° but not to rotate the direction of polarization of red light components. Furthermore, a polarizer 16B is disposed proximate the exit side of the wavelength-selective polarization rotator 17. According to this structure, the p-polarized red light component 12r and the s-polarized blue light component 12b passing through the wavelength-selective polarization rotator 17 respectively become a p-polarized red light component 18r and a p-polarized blue light component 18b. Moreover, the p-polarized red light component 18r and the p-polarized blue light component 18b enter the polarizer 16B where undesirable polarized light portions are substantially removed therefrom. Here, the undesirable polarized light portions are s-polarized light portions of the red light component 18r and the blue light component 18b. Subsequently, the p-polarized red light component 18r and the p-polarized blue light component 18b enter the color combiner 19.

Figure 3:
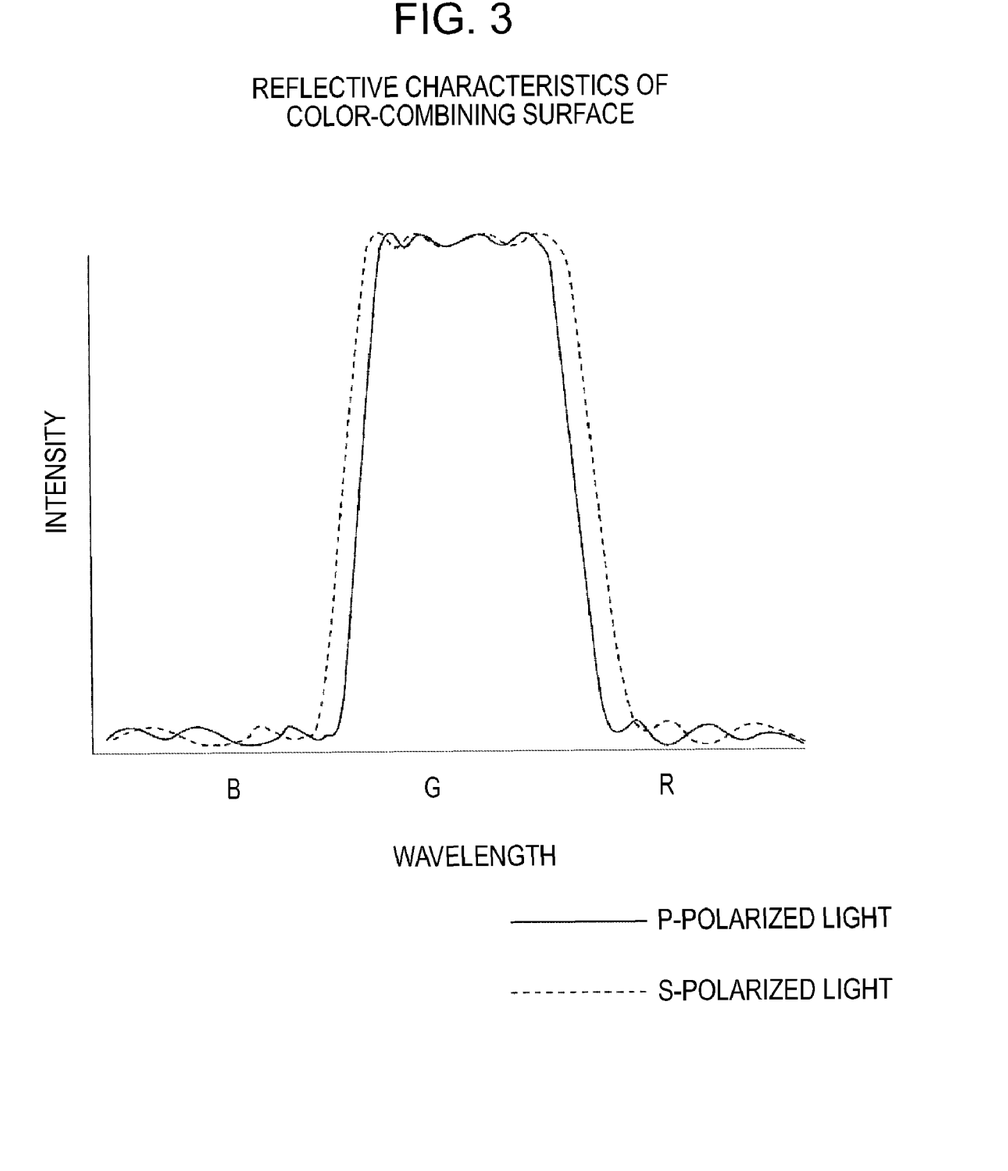
FIG. 3 illustrates the characteristics of a color combiner according to at least one exemplary embodiment.

A color-combining surface 20 of the color combiner 19 is defined by a green-reflective dichroic film which includes a dielectric multilayer film, such that the color-combining surface 20 reflects the s-polarized green light component 18g but transmits the p-polarized red light component 18r and the p-polarized blue light component 18b. The color-combining surface 20 combines the optical paths of the red light component and the blue light component and the optical path of the green light component. FIG. 3 schematically illustrates the reflective and transmissive characteristics of the red, green, and blue light components. Generally, the reflective wavelength range of a dichroic film is wider for s-polarized light than p-polarized light, meaning that the transmissive wavelength range is wider for p-polarized light than s-polarized light. According to the first exemplary embodiment, since the green light component 18g is s-polarized and the red light component 18r and the blue light component 18b are p-polarized, the bandwidths of the three colors overlap with one another as shown in FIG. 3. This facilitates efficient utilization of the colors.

The three color light components 18r, 18g, 18b combine by the color combiner 19 pass through a retardation plate (quarter-waveplate) 21 and are projected onto a screen (not shown) by a projection lens 22. The projection lens 22 can alternatively include, for example, a mirror. Although the first exemplary embodiment is being described based on a front projector, the first exemplary embodiment can alternatively be directed to a rear projector. In that case, the projection lens 22 can project an image onto a screen member that includes, for example, a lenticular lens or a Fresnel lens.

The retardation plate 21 can have a phase difference of substantially a quarter-wavelength. When one of the color light components enters the projection lens 22 via the retardation plate 21, a feedback light portion of the color light component reflected by one of transmissive planes of the projection lens 22 returns to the retardation plate 21. The direction of polarization of the feedback light portion returning to the retardation plate 21 is rotated by about 90° with respect to the direction of polarization of the color light component that had entered the retardation plate 21 the first time.

For example, a feedback light portion of the s-polarized green light component 18g reflected by the projection lens 22 returns to the retardation plate 21, and subsequently, the feedback light portion in a p-polarized state is reflected by the color combiner 19 and becomes incident on the polarizer 16A where the feedback light portion is absorbed. In a similar fashion, feedback light portions of the p-polarized red light component 18r and the p-polarized blue light component 18b are absorbed by the polarizer 16B. In other words, each feedback light portion reflected by one of the transmissive planes of the projection lens 22 is absorbed before reaching the corresponding panel surface. Consequently, each feedback light portion reflected by the projection lens 22 and returning to the corresponding retardation plate is absorbed by the corresponding polarizer without returning to the projection lens 22 again. This reduces image deterioration (low contrast) on the screen, which is caused by light reflection in the projection lens 22.

Figure 2:
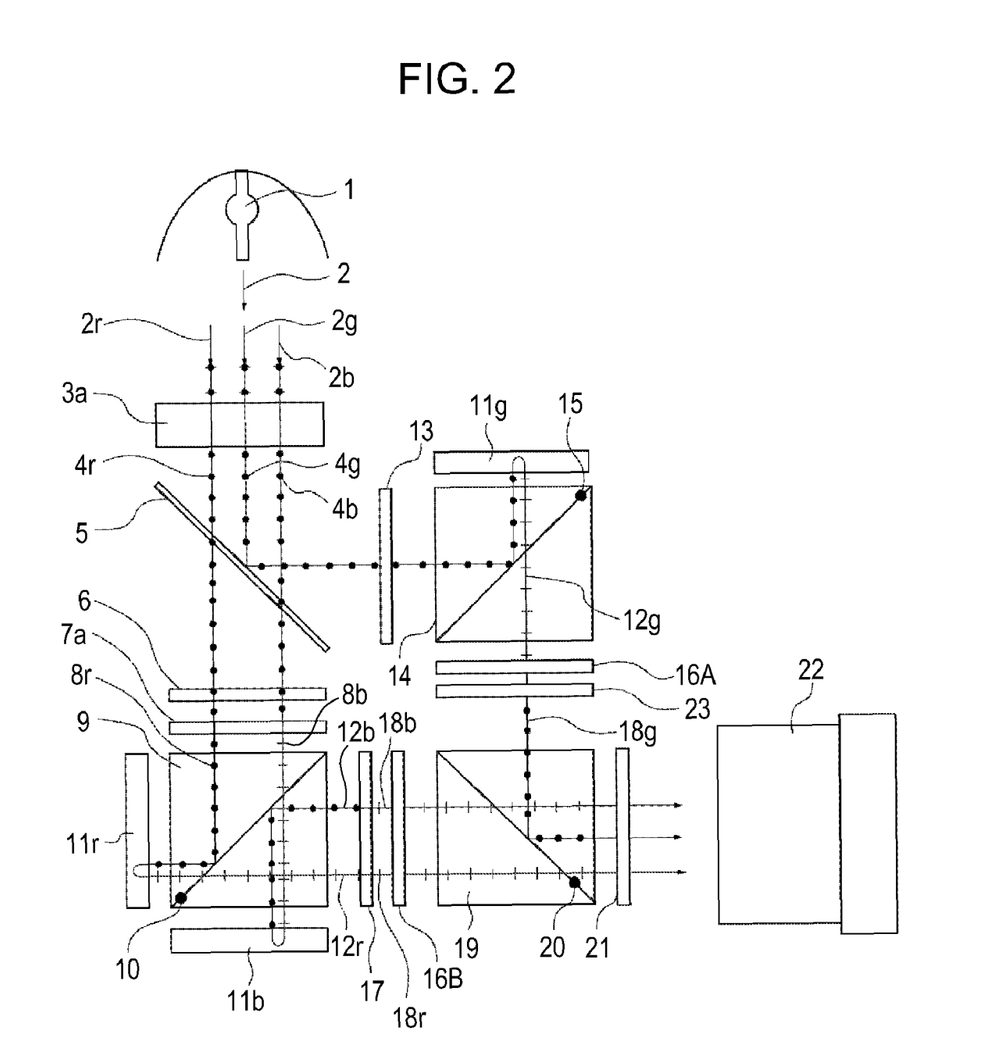
FIG. 2 is a schematic diagram illustrating a modification example of the first exemplary embodiment.

A modification of the first exemplary embodiment will be below described with reference to FIG. 2. In this example, the light components released from the polarization converter 3a are s-polarized. Thus, these light components are in a polarized state in which the electric field vibrates in a direction substantially perpendicular to the drawing plane of FIG. 2. This example is different from the first exemplary embodiment described above in that the reflective liquid-crystal panel 11g for green color is disposed in a different position along the optical path of the green light component. Moreover, the green light component 12g passing through the polarizer 16A disposed proximate the exit side of the polarizing beam splitter 14 has its direction of polarization rotated by about 90° by a half-retardation plate 23. Subsequently, the green light component 18g, which is s-polarized by having its direction of polarization been rotated by about 90°, enters the color combiner 19. The s-polarized green light component 18g is reflected by the color combiner 19 so as to enter the projection lens 22. In addition to these differences, this example is also different from the first exemplary embodiment described above in that the wavelength-selective polarization rotator 7a disposed in the optical paths of the red light component and the blue light component has the capability to rotate the direction of polarization of the blue light component by about 90° but not to rotate the direction of polarization of the red light component. The red light component 4r and the blue light component 4b passing through the wavelength-selective polarization rotator 7a are respectively converted to an s-polarized light component and a p-polarized light component. Other than these small structural differences, this modification example basically has the same structure as the first exemplary embodiment.

Alternatively, in the first exemplary embodiment, the dichroic mirror 5 can be replaced with a polarizing beam splitter. In that case, in front of the polarizing beam splitter, that is, between the polarization converter 3 and the polarizing beam splitter replaced with the dichroic mirror 5, a wavelength-selective polarization rotator (wavelength-selective retardation plate) can be provided. The wavelength-selective polarization rotator (wavelength-selective retardation plate) can rotate the direction of polarization of a green light component by about 90° or can rotate the direction of polarization of one of the two remaining color light components by about 90°. Alternatively, the wavelength-selective polarization rotator (wavelength-selective retardation plate) can rotate the direction of polarization of two of the color light components by about 90°. As a further alternative, in addition to replacing the dichroic mirror 5 with a polarizing beam splitter, the laser light-source components corresponding to the three colors can be provided, as described previously.

Furthermore, although the color combiner 19 is defined by a dichroic mirror or a dichroic prism in the first exemplary embodiment, the color combiner 19 can alternatively be a polarizing beam splitter. In that case, in view of the fact that the p-polarized feedback light portion of the green light component passes through the polarizing beam splitter defining the color combiner 19, the polarizer 16B can absorb the p-polarized feedback light portion within the wavelength range of green color. On the other hand, due to the fact that the s-polarized feedback light portions of the blue and red light components are reflected by the polarizing beam splitter defining the color combiner 19, the polarizer 16A can absorb the s-polarized feedback light portions of the blue and red light components.

Second Exemplary Embodiment

Figure 4:
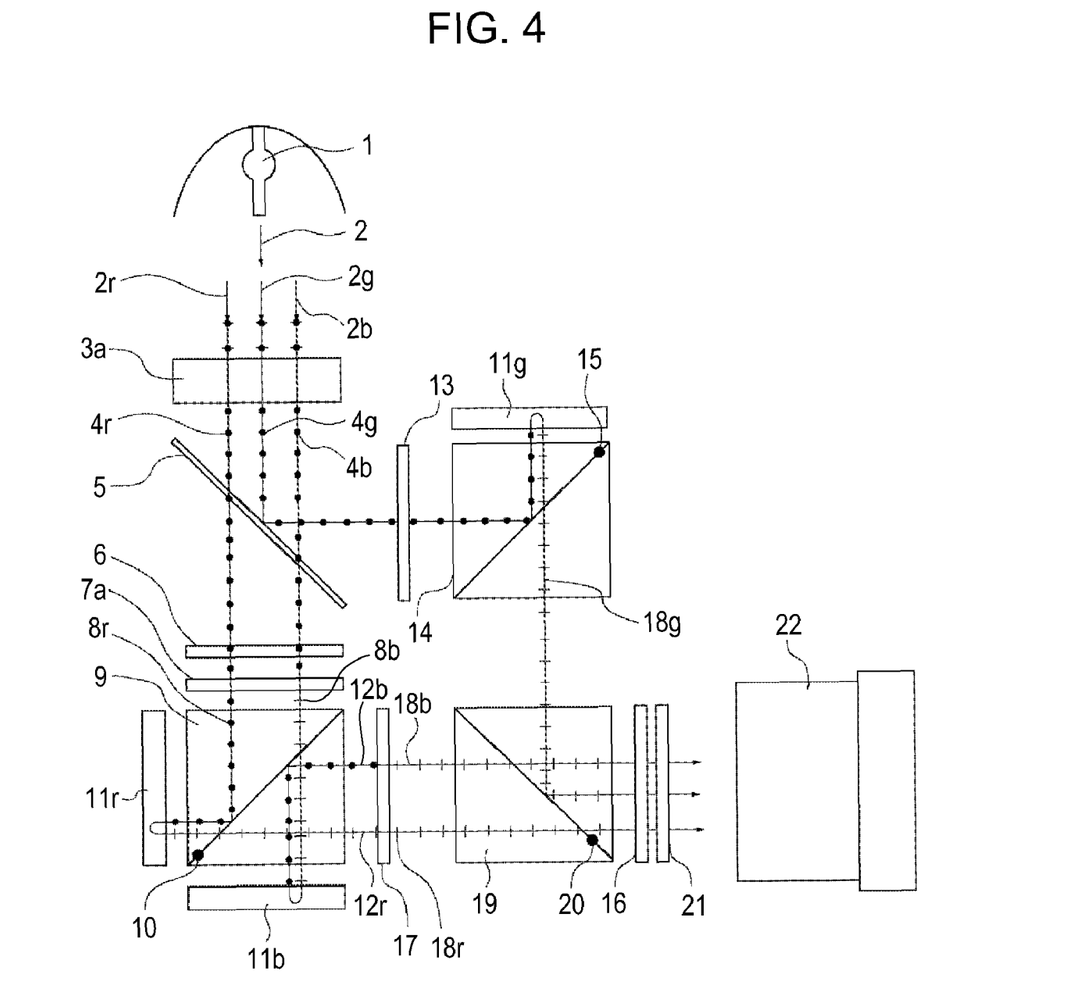
FIG. 4 is a schematic diagram illustrating a second exemplary embodiment.

FIG. 4 illustrates a second exemplary embodiment. Detailed descriptions of some elements of the second exemplary embodiment are omitted due to the fact that these elements are similar to those in the first exemplary embodiment.

A white light beam emitted from the light source 1 is reflected by a reflector and becomes a substantially collimated light beam 2. The white light beam can be split into three primary colors, for example, the red light component 2r, the green light component 2g, and the blue light component 2b.

The polarization converter 3a disposed in the intermediate section of the optical illumination system aligns the direction of polarization of these light components so as to facilitate the s-polarization of these light components. Thus, these light components are in a polarized state in which the electric field vibrates in a direction substantially perpendicular to the drawing plane of FIG. 4. As a result, the red light component 2r becomes an s-polarized red light component 4r, the green light component 2g becomes an s-polarized green light component 4g, and the blue light component 2b becomes an s-polarized blue light component 4b.

The dichroic mirror 5 selectively reflects green light components, meaning that the dichroic mirror 5 reflects the s-polarized green light component 4g while transmitting the s-polarized red light component 4r and the s-polarized blue light component 4b. The s-polarized red light component 4r and the s-polarized blue light component 4b transmitted through the dichroic mirror 5 pass through the polarizer 6 such that the degree of polarization of these light components 4r and 4b is increased. Subsequently, the light components 4r and 4b enter the wavelength-selective polarization rotator 7a.

The wavelength-selective polarization rotator 7a has the capability to rotate the direction of polarization of blue light components by about 90° but not to rotate the direction of polarization of red light components. Thus, the s-polarized red light component 4r and the s-polarized blue light component 4b passing through the wavelength-selective polarization rotator 7a respectively become an s-polarized red light component 8r and a p-polarized blue light component 8b. The s-polarized red light component 8r and the p-polarized blue light component 8b then enter the polarizing beam splitter 9.

The s-polarized red light component 8r incident on the polarizing beam splitter 9 is reflected by the polarization beam splitting surface 10 and thus enters the reflective liquid-crystal panel 11r. When the reflective liquid-crystal panel 11r is in an ON mode, the s-polarized red light component 8r becomes a p-polarized red light component 12r which re-enters the polarizing beam splitter 9. Due to being p-polarized this time, the p-polarized red light component 12r passes through the polarization beam splitting surface 10 and thus exits the polarizing beam splitter 9.

On the other hand, due to being p-polarized, the p-polarized blue light component 8b passes through the polarization beam splitting surface 10 and thus enters the reflective liquid-crystal panel 11b. When the reflective liquid-crystal panel 11b is in an ON mode, the p-polarized blue light component 8b becomes an s-polarized blue light component 12b which re-enters the polarizing beam splitter 9. Due to being s-polarized this time, the s-polarized blue light component 12b is reflected by the polarization beam splitting surface 10 and thus exits the polarizing beam splitter 9.

On the other hand, the s-polarized green light component 4g reflected by the dichroic mirror 5 passes through the polarizer 13 where the degree of polarization of the s-polarized green light component 4g is increased. The s-polarized green light component 4g then enters the polarizing beam splitter 14 so as to reach the polarization beam splitting surface 15. The s-polarized green light component 4g is reflected by the polarization beam splitting surface 15 and thus enters the reflective liquid-crystal panel 11g. When the reflective liquid-crystal panel 11g is in an ON mode, the s-polarized green light component 4g becomes a p-polarized green light component 18g which re-enters the polarizing beam splitter 14. Due to being p-polarized this time, the p-polarized green light component 18g passes through the polarization beam splitting surface 15 and thus exits the polarizing beam splitter 14.

The p-polarized red light component 12r and the s-polarized blue light component 12b exiting the polarizing beam splitter 9 enter the wavelength-selective polarization rotator 17. The wavelength-selective polarization rotator 17 has the capability to rotate the direction of polarization of blue light components by about 90° but not to rotate the direction of polarization of red light components. Thus, the p-polarized red light component 12r and the s-polarized blue light component 12b passing through the wavelength-selective polarization rotator 17 respectively become a p-polarized red light component 18r and a p-polarized blue light component 18b. The p-polarized red light component 18r and the p-polarized blue light component 18b then enter the color combiner 19.

The color-combining surface 20 of the color combiner 19 is defined by a green-reflective dichroic film. The color-combining surface 20 combine the optical paths of the p-polarized red light component 18r, the p-polarized green light component 18g, and the p-polarized blue light component 18b. The p-polarized red light component 18r, the p-polarized green light component 18g, and the p-polarized blue light component 18b released from the color combiner 19 pass through a polarizer 16 where undesirable polarized light portions are substantially removed from the light components 18r, 18g, and 18b. In this case, the undesirable polarized light portions are s-polarized light portions. Subsequently, the p-polarized red light component 18r, the p-polarized green light component 18g, and the p-polarized blue light component 18b pass through the retardation plate 21 and are projected onto a projection surface (e.g., a screen), by the projection lens 22.

The retardation plate 21 can have a phase difference of substantially a quarter-wavelength and releases the color light components toward the projection lens 22 in a manner such that all the color light components have their polarization state converted to a circularly polarized state. When one of the color light components enters the projection lens 22 via the retardation plate 21, a feedback light portion of the color light component reflected by one of transmissive planes of the projection lens 22 returns to the retardation plate 21. The direction of polarization of the feedback light portion returning to the retardation plate 21 is rotated by about 90° with respect to the direction of polarization of the color light component that had entered the retardation plate 21 the first time. Accordingly, after passing through the retardation plate 21, the feedback light portions of the p-polarized red light component 18r, the p-polarized green light component 18g, and the p-polarized blue light component 18b are absorbed by the polarizer 16. In other words, each feedback light portion reflected by one of the transmissive planes of the projection lens 22 is absorbed before reaching the corresponding panel surface, and thus reflection and re-projection onto the screen is reduced. This reduces deterioration (low contrast) of the projected image on the screen.

Even though the second exemplary embodiment can be different with respect to the first exemplary embodiment, in view of the efficiency of color combining due to the fact that the red, green, and blue light components are released in the same polarized state, the second exemplary embodiment can use a lesser number of parts and can provide a product at a lower cost.

Third Exemplary Embodiment

Figure 5:
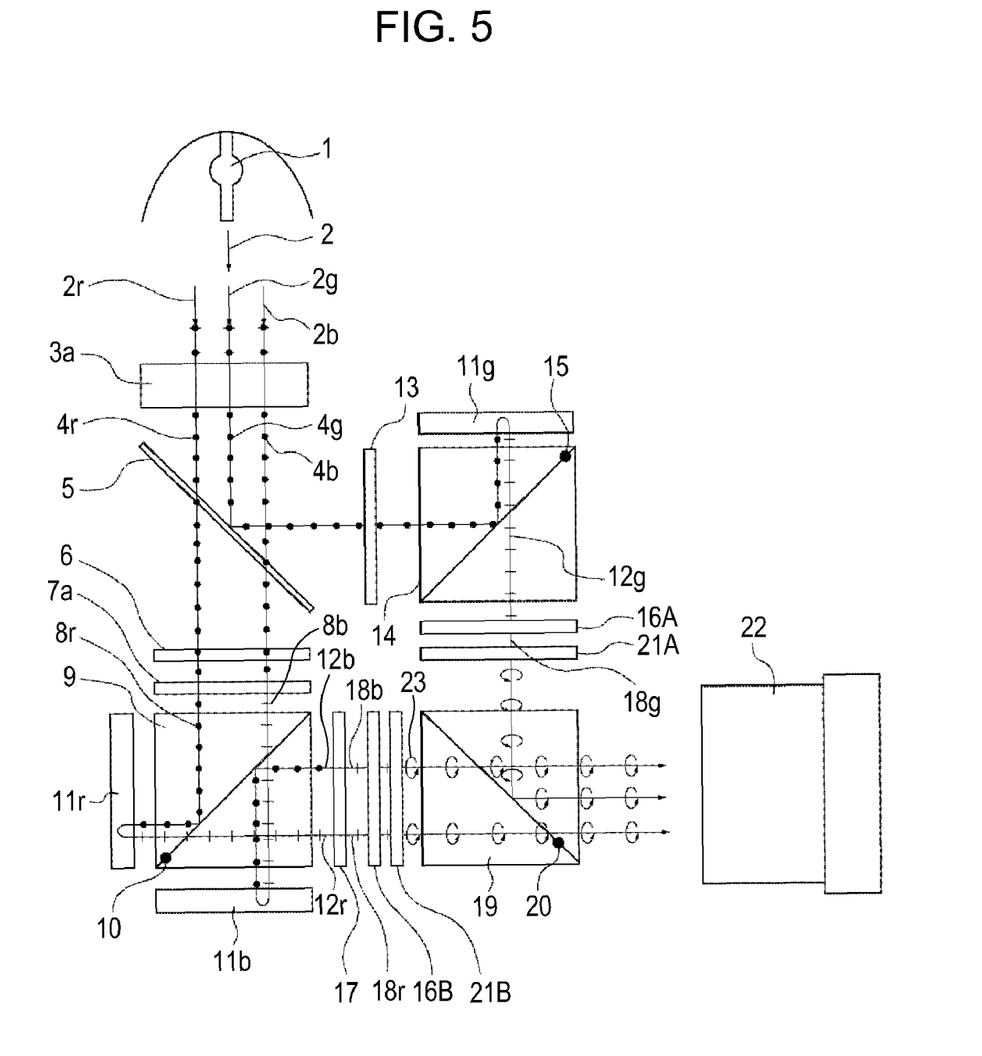
FIG. 5 is a schematic diagram illustrating a third exemplary embodiment.

FIG. 5 illustrates a third exemplary embodiment. Detailed descriptions of some elements of the third exemplary embodiment are omitted due to the fact that these elements are similar to those in the first exemplary embodiment.

A white light beam emitted from the light source 1 is reflected by a reflector and becomes a substantially collimated light beam 2. The white light beam can be split into three primary colors, namely, the red light component 2r, the green light component 2g, and the blue light component 2b.

The polarization converter 3a disposed in the intermediate section of the optical illumination system aligns the direction of polarization of these light components so as to facilitate the s-polarization of these light components. Thus, these light components are in a polarized state in which the electric field vibrates in a direction substantially perpendicular to the drawing plane of FIG. 5. As a result, the red light component 2r becomes an s-polarized red light component 4r, the green light component 2g becomes an s-polarized green light component 4g, and the blue light component 2b becomes an s-polarized blue light component 4b.

The dichroic mirror 5 selectively reflects green light components, meaning that the dichroic mirror 5 reflects the s-polarized green light component 4g while transmitting the s-polarized red light component 4r and the s-polarized blue light component 4b. The s-polarized red light component 4r and the s-polarized blue light component 4b transmitted through the dichroic mirror 5 pass through the polarizer 6 where the degree of polarization of these light components 4r and 4b is increased. Subsequently, the light components 4r and 4b enter the wavelength-selective polarization rotator 7a.

The wavelength-selective polarization rotator 7a has the capability to rotate the direction of polarization of blue light components by about 90° but not to rotate the direction of polarization of red light components. The s-polarized red light component 4r and the s-polarized blue light component 4b passing through the wavelength-selective polarization rotator 7a respectively become an s-polarized red light component 8r and a p-polarized blue light component 8b. The s-polarized red light component 8r and the p-polarized blue light component 8b then enter the polarizing beam splitter 9.

The s-polarized red light component 8r incident on the polarizing beam splitter 9 is reflected by the polarization beam splitting surface 10 and thus enters the reflective liquid-crystal panel 11r. When the reflective liquid-crystal panel 11r is in an ON mode, the s-polarized red light component 8r becomes a p-polarized red light component 12r which re-enters the polarizing beam splitter 9. Due to being p-polarized this time, the p-polarized red light component 12r passes through the polarization beam splitting surface 10 and thus exits the polarizing beam splitter 9.

On the other hand, due to being p-polarized, the p-polarized blue light component 8b passes through the polarization beam splitting surface 10 and thus enters the reflective liquid-crystal panel 11b. When the reflective liquid-crystal panel 11b is in an ON mode, the p-polarized blue light component 8b becomes an s-polarized blue light component 12b which re-enters the polarizing beam splitter 9. Due to being s-polarized this time, the s-polarized blue light component 12b is reflected by the polarization beam splitting surface 10 and thus exits the polarizing beam splitter 9.

On the other hand, the s-polarized green light component 4g reflected by the dichroic mirror 5 passes through the polarizer 13 where the degree of polarization of the s-polarized green light component 4g is increased. The s-polarized green light component 4g then enters the polarizing beam splitter 14 so as to reach the polarization beam splitting surface 15. The s-polarized green light component 4g is reflected by the polarization beam splitting surface 15 and thus enters the reflective liquid-crystal panel 11g. When the reflective liquid-crystal panel 11g is in an ON mode, the s-polarized green light component 4g becomes a p-polarized green light component 12g which re-enters the polarizing beam splitter 14. Due to being p-polarized this time, the p-polarized green light component 12g passes through the polarization beam splitting surface 15 and thus exits the polarizing beam splitter 14.

The p-polarized red light component 12r and the s-polarized blue light component 12b exiting the polarizing beam splitter 9 enters the wavelength-selective polarization rotator 17. The wavelength-selective polarization rotator 17 has the capability to rotate the direction of polarization of blue light components by about 90° but not to rotate the direction of polarization of red light components. Thus, the p-polarized red light component 12r and the s-polarized blue light component 12b passing through the wavelength-selective polarization rotator 17 respectively become a p-polarized red light component 18r and a p-polarized blue light component 18b. The p-polarized red light component 18r and the p-polarized blue light component 18b then pass through the polarizer 16B where undesirable polarized light portions are substantially removed from the p-polarized red light component 18r and the p-polarized blue light component 18b. Subsequently, the p-polarized red light component 18r and the p-polarized blue light component 18b pass through a retardation plate 21B so as to enter the color combiner 19.

On the other hand, the p-polarized green light component 12g released from the polarizing beam splitter 14 is transmitted through the polarizer 16A where an undesirable polarized light portion is substantially removed from the p-polarized green light component 12g. The p-polarized green light component 12g thus becomes a p-polarized green light component 18g. In this case, the undesirable polarized light portion is an s-polarized light portion. Subsequently, the p-polarized green light component 18g passes through a retardation plate 21A so as to enter the color combiner 19.

The retardation plates 21A, 21B give a phase difference of substantially a quarter-wavelength to the corresponding color light components. Consequently, the p-polarized red light component 18r, the p-polarized green light component 18g, and the p-polarized blue light component 18b enter the color combiner 19 in a circularly polarized state.

The color-combining surface 20 of the color combiner 19 is defined by a green-reflective dichroic film, meaning that the color-combining surface 20 transmits red and blue colors. The color-combining surface 20 combines the optical paths of the p-polarized red light component 18r, the p-polarized green light component 18g, and the p-polarized blue light component 18b. The p-polarized red light component 18r, the p-polarized green light component 18g, and the p-polarized blue light component 18b released from the color combiner 19 enter the projection lens 22 in a state where their optical paths are combined, and are subsequently projected onto a screen by the projection lens 22.

According to this structure, a green light component reflected by the projection lens 22 re-enters the retardation plate 21A so as to become incident on the polarizer 16A in an s-polarized state. As a result, this reflected green light component is absorbed by the polarizer 16A. Similarly, red and blue light components reflected by the projection lens 22 re-enter the retardation plate 21B so as to become incident on the polarizer 16B in an s-polarized state. As a result, these reflected red and blue light components are absorbed by the polarizer 16B. Accordingly, since the polarizers 16A, 16B absorb light components that could cause contrast deterioration when these light components are reflected by the projection lens 22 and are reflected again to be projected back onto the screen, the projected image deterioration due to low contrast is reduced.

Although the third exemplary embodiment can use a larger number of parts in comparison with the first exemplary embodiment, the third exemplary embodiment can reduce the number of surfaces through which the light components pass after the retardation plates. Accordingly, since the feedback light portions caused by surface reflection can be further reduced, higher contrast can be achieved.

Fourth Exemplary Embodiment

Figure 6:
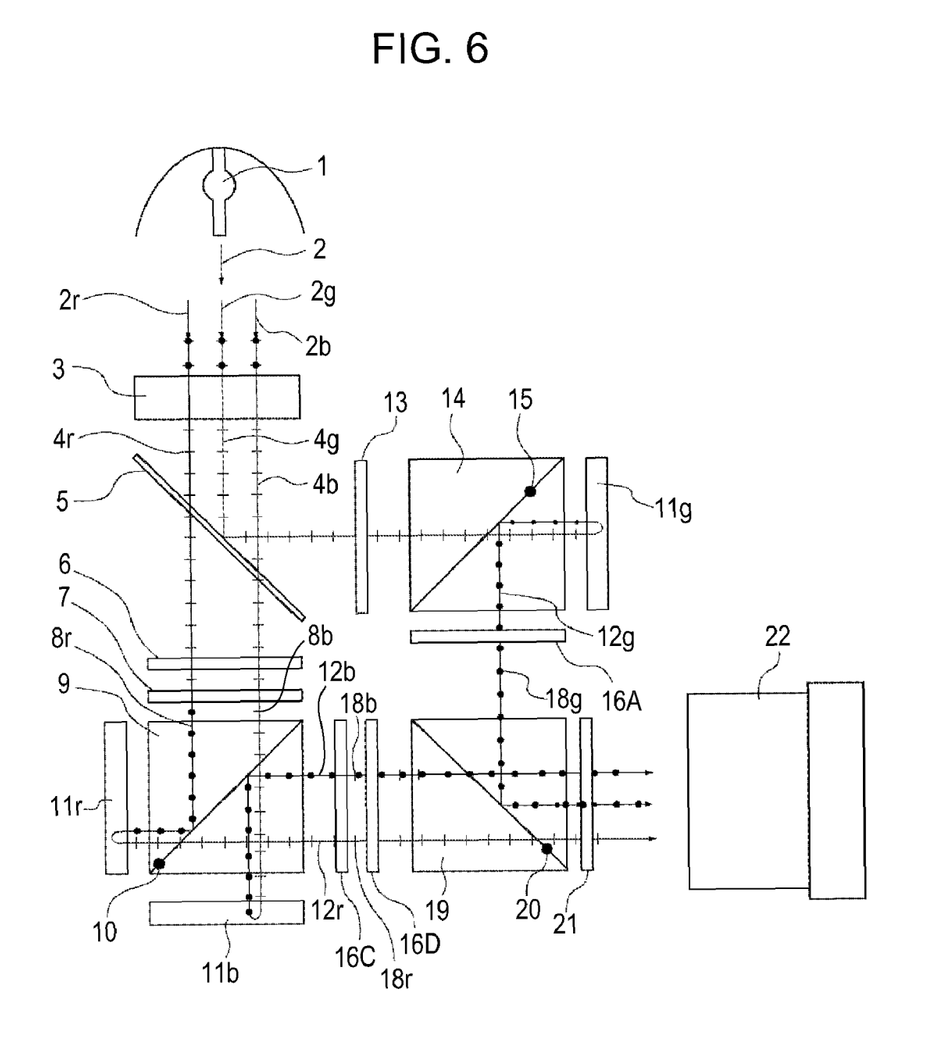
FIG. 6 is a schematic diagram illustrating a fourth exemplary embodiment.

FIG. 6 illustrates a color separating/combining system according to a fourth exemplary embodiment. The fourth exemplary embodiment will be described below in detail with reference to FIG. 6. The fourth exemplary embodiment shown in FIG. 6 is common with the first exemplary embodiment shown in FIG. 1 in view of the following points. Specifically, one of the common points is the way the green light component of a light beam emitted from the light source 1 travels toward the color combiner (optical-path combining prism) 19. Another common point is how the red and blue light components of the light beam emitted from the light source 1 entering the polarization beam splitting surface 10 are respectively reflected by the reflective liquid-crystal panels 11r, 11b and re-enter the polarization beam splitting surface 10. Moreover, in the polarization beam splitting surface 10, the red and blue light components have their optical paths of image light combined, and subsequently exit the polarizing beam splitter 9 so as to travel towards the color combiner 19. Detailed descriptions of some elements of the fourth exemplary embodiment are omitted due to the fact that these elements are similar to those in the first exemplary embodiment.

The fourth exemplary embodiment differs from the first exemplary embodiment in that the s-polarized blue light component 12b (in which the electromagnetic wave vibrates in a direction substantially perpendicular to the drawing plane of FIG. 6) released from the polarizing beam splitter 9 and the p-polarized red light component 12r released from the polarizing beam splitter 9 enter the color combiner 19 respectively via a blue-designated polarizer 16C and a red-designated polarizer 16D. Specifically, the blue-designated polarizer 16C guides an s-polarized light portion included in a light component corresponding to the blue wavelength range towards the projection lens 22 while blocking, or absorbing, a p-polarized light portion included in the blue light component from entering the projection lens 22. Moreover, the blue-designated polarizer 16C guides a light component corresponding to the red wavelength range entirely towards the projection lens 22 (although there may be cases where the transmittance is not 100%, the transmittance or the reflectance of the blue-designated polarizer 16C is set at a selected percentage (e.g., about 90%, greater than or equal to 95%) with respect to both s-polarized and p-polarized light portions). On the other hand, the red-designated polarizer 16D guides a p-polarized light portion included in a light component corresponding to the red wavelength range towards the projection lens 22 while blocking, or absorbing, an s-polarized light included in the red light component from entering the projection lens 22. Moreover, the red-designated polarizer 16D guides a light component corresponding to the blue wavelength range entirely towards the projection lens 22. In this case, whichever one of the blue-designated polarizer 16C and the red-designated polarizer 16D can be disposed closer to the light source 1. Alternatively, the blue-designated polarizer 16C and the red-designated polarizer 16D can be integrated with each other. As a further alternative, a wavelength-selective polarizer having the characteristics of both the blue-designated polarizer 16C and the red-designated polarizer 16D can be disposed between the polarizing beam splitter 9 and the color combiner 19.

The blue-designated polarizer 16C functions as a polarizer for blue light components, and functions as an optical member that transmits both s-polarized and p-polarized light portions for light components in the wavelength ranges of other colors. Similarly, the red-designated polarizer 16D functions as a polarizer for red light components, and functions as an optical member that transmits both s-polarized and p-polarized light portions for light components in the wavelength ranges of other colors. In order to contribute to an overall size reduction of the apparatus, the blue-designated polarizer 16C can transmit a s-polarized light portion of the blue light component and absorb a p-polarized light portion of the blue light component, and can be disposed substantially perpendicular to the optical axis. On the other hand, the red-designated polarizer 16D can transmit a p-polarized light portion of the red light component and absorb an s-polarized light portion of the red light component, and can be disposed substantially perpendicular to the optical axis. The optical axis is defined by an optical path of a main beam of light released from the center of each reflective liquid-crystal panel or an optical path of the main beam extending back towards the light source 1. The p-polarized light portion of the blue light component can alternatively be reflected by the blue-designated polarizer 16C, but in that case, the blue-designated polarizer 16C can be disposed at an angle with respect to the optical axis. Therefore, this could lead to an increase in the size of the apparatus. Although the retardation plate 21 is disposed between the color combiner 19 and the projection lens 22 in the fourth exemplary embodiment, the fourth exemplary embodiment is not limited to this configuration. For example, due to the fact that the color combiner 19 is defined by a dichroic prism or a dichroic mirror, a first quarter-waveplate can be disposed between the polarizer 16A and the color combiner 19, and a second quarter-waveplate can be disposed between the red-designated polarizer 16D and the color combiner 19.

According to the structure described above, reflected light from the projection lens 22 returning to the projection lens 22 is reduced, whereby contrast deterioration can be reduced. Accordingly, this improves the performance of the image display apparatus especially in view of the contrast properties.

The first, second, third, and fourth exemplary embodiments or portions thereof can be combined with each other. Moreover, the red, green, and blue light components can be switched with one another in the above embodiments. Furthermore, in the above embodiments, instead of dividing the visible range into red, green, and blue wavelength ranges, the visible range can alternatively be divided into at least four wavelength ranges such that the apparatus corresponds to each light component of the corresponding wavelength range.

Furthermore, although at least a few exemplary embodiments are directed to a liquid-crystal display apparatus (e.g., having a plurality of reflective liquid-crystal display panels and a plurality of polarizing beam splitters) configured to perform color separation and color combination, at least one exemplary embodiment can alternatively be applied to transmissive liquid crystal projectors and single-panel liquid-crystal projectors. In a case where an exemplary embodiment is directed to a transmissive liquid-crystal projector, the optical path extending from each reflective liquid-crystal panel to the optical projecting system defined by the projection lens 22 according to the above embodiments can be applied similarly to the transmissive liquid-crystal projector, and the optical illumination system disposed upstream of the optical path can be combined with a typical optical system.

A projector-type image display apparatus equipped with reflective liquid-crystal panels, in accordance with at least one exemplary embodiment, facilitates the reduction of the two aforementioned problems, further facilitating the achievement of a higher contrast. Furthermore, a color separating/combining system, in accordance with at least one exemplary embodiment, facilitates a simple-structured, low-cost projector equipped with reflective liquid-crystal panels and having high contrast properties.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A projector-type image display apparatus comprising:
 a first liquid crystal panel configured to modulate a first color light beam;
 a second liquid crystal panel configured to modulate a second color light beam;
 a combiner configured to combine optical paths of light beams received from the first and second liquid crystal panels;
 a projection optical system configured to project a light beam combined by the combiner;
 a first polarizer disposed between the combiner and the first liquid crystal panel and configured to transmit a light of a first polarization direction and to absorb a light of a second polarization direction perpendicular to the first polarization direction;
 a second polarizer disposed between the combiner and the second liquid crystal panel and configured to transmit a light of the second polarization direction and to absorb a light of the first polarization direction; and a retardation plate disposed between the combiner and the projection optical system,
 wherein the first color light beam and the second color light beam enter the projection optical system in a manner such that the direction of polarization of the first color light beam is different from the direction of polarization of the second color light beam.

2. The projector-type image display apparatus according to claim 1, wherein the retardation plate gives a phase difference of a quarter-wavelength to entering light beams.

3. The projector-type image display apparatus according to claim 1, wherein the retardation plate is a quarter-waveplate.

4. The projector-type image display apparatus according to claim 3, wherein only one quarter-waveplate is disposed between the combiner and the projection optical system.

5. The projector-type image display apparatus according to claim 1, wherein the first color light beam is a light beam within a wavelength range of a green color.

6. The projector-type image display apparatus according to claim 1, wherein the combiner reflects a light within a wavelength range of a green color regardless of its polarization direction.

7. The projector-type image display apparatus according to claim 1, wherein the combiner transmits a light within a wavelength range of a green color regardless of its polarization direction.

8. A projector-type full-color image display apparatus comprising:
   a liquid crystal panel for a green color configured to modulate an incident light beam;
   a projection optical system configured to project a light beam received from the liquid crystal panel onto a projection surface;
   a polarizer disposed between the projection optical system and the liquid crystal panel and configured to transmit a light of a first polarization direction and to absorb a light of a second polarization direction perpendicular to the first polarization direction; and
   a retardation plate disposed between the projection optical system and the polarizer,
   wherein light beams in different wavelength ranges enter the projection optical system in a manner such that the direction of polarization of the light beam of a green wavelength range is different from the direction of polarization of the light beams of the remaining wavelength ranges.

9. The projector-type full-color image display apparatus according to claim 8, wherein a light reflected on an optical surface in the projection optical system is absorbed by the polarizer.

10. The projector-type full-color image display apparatus according to claim 8, wherein the retardation plate gives a phase difference of a quarter-wavelength to entering light beams.

11. The projector-type full-color image display apparatus according to claim 8, wherein the retardation plate is a quarter-waveplate.

12. The projector-type full-color image display apparatus according to claim 8, further comprising:
   a liquid crystal panel for a red color configured to modulate an incident light beam;
   a liquid crystal panel for a blue color configured to modulate an incident light beam; and
   a combiner disposed between the projection optical system and the polarizer and configured to combine optical paths of light beams received from the liquid crystal panel for the red color and the liquid crystal panel for the blue color.

13. The projector-type full-color image display apparatus according to claim 12, wherein only one retardation plate is disposed between the combiner and the projection optical system.

14. The projector-type full-color image display apparatus according to claim 12, wherein the combiner reflects a light within a wavelength range of a green color regardless of its polarization direction.

15. The projector-type full-color image display apparatus according to claim 12, wherein the combiner transmits a light within a wavelength range of a green color regardless of its polarization direction.

* * * * *